United States Patent
Kappes (10) Patent No.: US 9,828,876 B2
(45) Date of Patent: Nov. 28, 2017

(54) FAN CONTAINMENT CASE

(71) Applicant: Rolls-Royce Corporation, Indianapolis, IN (US)

(72) Inventor: Matthew J. Kappes, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 284 days.

(21) Appl. No.: 14/696,963

(22) Filed: Apr. 27, 2015

(65) Prior Publication Data

US 2015/0308290 A1  Oct. 29, 2015

Related U.S. Application Data

(60) Provisional application No. 61/985,129, filed on Apr. 28, 2014.

(51) Int. Cl.
| | |
|---|---|
| *F01D 11/12* | (2006.01) |
| *F01D 25/24* | (2006.01) |
| *F01D 25/04* | (2006.01) |
| *F01D 21/04* | (2006.01) |

(52) U.S. Cl.
CPC ............ *F01D 25/24* (2013.01); *F01D 11/122* (2013.01); *F01D 21/045* (2013.01); *F01D 25/04* (2013.01); *F05D 2220/32* (2013.01); *F05D 2220/36* (2013.01); *F05D 2230/50* (2013.01); *F05D 2230/60* (2013.01); *F05D 2300/603* (2013.01); *F05D 2300/6012* (2013.01); *F05D 2300/615* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 4,490,092 A | 12/1984 | Premont | |
| 4,534,698 A * | 8/1985 | Tomich | F01D 21/045 415/121.2 |
| 5,160,248 A * | 11/1992 | Clarke | F01D 21/045 156/276 |
| 5,344,280 A * | 9/1994 | Langenbrunner | F01D 21/045 415/119 |
| 5,516,257 A | 5/1996 | Kasprow et al. | |
| 6,382,905 B1 * | 5/2002 | Czachor | F01D 11/122 415/128 |
| 6,497,550 B2 | 12/2002 | Booth | |

(Continued)

FOREIGN PATENT DOCUMENTS

| | | |
|---|---|---|
| EP | 2070689 A2 | 6/2009 |
| FR | 2375443 A1 | 7/1978 |
| WO | 2013088088 A1 | 6/2013 |

OTHER PUBLICATIONS

Extended European Search Report, European Application No. 15163607.3-1610, search dated Sep. 9, 2015, 7 pages.

*Primary Examiner* — Dwayne J White
*Assistant Examiner* — Theodore Ribadeneyra
(74) *Attorney, Agent, or Firm* — Barnes & Thornburg LLP (57) ABSTRACT

A fan case for use in a gas turbine engine of an aircraft includes an outer shroud and a liner extending along the outer shroud. The fan case provides a protective band that blocks fan blades from being thrown out of the fan case in case of a blade-off event in which a fan blade is released during operation of the gas turbine engine.

15 Claims, 5 Drawing Sheets

(56) References Cited

U.S. PATENT DOCUMENTS

| | | |
|---|---|---|
| 6,814,541 B2 | 11/2004 | Evans et al. |
| 7,713,021 B2 | 5/2010 | Finn et al. |
| 7,832,983 B2 | 11/2010 | Kruckenberg et al. |
| 8,061,966 B2 | 11/2011 | Xie et al. |
| 8,403,624 B2 | 3/2013 | Xie et al. |
| 8,500,390 B2 | 8/2013 | Wojtyczka et al. |
| 2004/0146393 A1* | 7/2004 | Evans ............... B29C 33/40 415/9 |
| 2004/0231155 A1* | 11/2004 | Le Saint ............... B23P 6/002 29/889.1 |
| 2006/0292002 A1* | 12/2006 | Sathianathan ....... F01D 21/045 415/173.3 |
| 2008/0069688 A1* | 3/2008 | Harper ............... F01D 21/045 415/196 |
| 2010/0111675 A1 | 5/2010 | Wojtyczka et al. |
| 2011/0142615 A1* | 6/2011 | Riou ............... B64D 33/02 415/220 |
| 2011/0232833 A1 | 9/2011 | Collins et al. |
| 2011/0286839 A1 | 11/2011 | Wojtyczka et al. |
| 2012/0134774 A1* | 5/2012 | Clark ............... B65D 43/0222 415/9 |
| 2013/0195635 A1 | 8/2013 | Robertson, Jr. et al. |
| 2013/0202424 A1 | 8/2013 | Lussier et al. |
| 2013/0216367 A1 | 8/2013 | Lussier et al. |
| 2014/0212273 A1* | 7/2014 | Le Borgne ........... F01D 21/045 415/119 |
| 2014/0255152 A1* | 9/2014 | Totten ............... F01D 25/24 415/9 |

\* cited by examiner

FAN CONTAINMENT CASE

CROSS REFERENCE TO RELATED APPLICATIONS

This application claims priority to and the benefit of U.S. Provisional Patent Application No. 61/985,129, filed on Apr. 28, 2014, the disclosure of which is now expressly incorporated herein by reference.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from being thrown out of the fan assembly in case of a blade-off event in which a fan blade is released from the fan rotor.

Fan cases sometimes include metallic shrouds, composite reinforcements, and sound attenuation devices (sometimes called dampers). The inclusion of metallic shrouds can cause fan cases to be heavy due to the size and strength required of a fan case. Composite reinforcements are generally used to strengthen metallic shrouds and may be coupled to metallic shrouds by hanger features that extend from the metallic shrouds or by adhesives that provide a permanent bond to the metallic shrouds. The sound attenuation devices are sometimes mounted to the metallic shrouds and are adapted to reduce the noise produced by rotation of the fan rotor in the fan case.

SUMMARY

The present disclosure may comprise one or more of the following features and combinations thereof.

A fan case adapted to extend around blades of a fan rotor included in a gas turbine engine may include an annular outer shroud and a composite liner. The annular outer shroud may be arranged around a central axis and extend axially between a front and a back of the fan case. The annular outer shroud may have an outer radial surface facing away from the central axis and an inner radial surface facing toward the central axis.

The composite liner may be arranged along the inner radial surface of the annular outer shroud. The composite liner may include an outer skin, an inner skin, and a liner-filler body. The outer skin may be arranged in confronting relation with the inner radial surface of the annular outer shroud. The inner skin may be bonded to the outer skin adjacent to the front of the fan case to form an axially-forward section of the composite liner and bonded to the outer skin adjacent to the back of the fan case to form an axially-rearward section of the composite liner. The liner-filler body may be arranged radially between the outer skin and the inner skin and axially between the axially-forward section and the axially-rearward section to form a force-distribution band between the front and the back of the fan case. The force-distribution band may be adapted to circumferentially distribute forces from a blade released outwardly from a fan rotor rotating in the fan case so that the forces are not point loaded onto the annular outer shroud when the released blade contacts the surrounding fan case.

In some embodiments, the axially-forward section of the composite liner defines a front pocket that receives a forward damper-filler body adapted to absorb noise from a rotating fan rotor. The forward damper-filler body may be arranged axially between the liner-filler body and the front of the fan case. The forward damper-filler body may include a honeycomb material having a density lower than a density of the liner-filler body.

In some embodiments, the axially-rearward section of the composite liner defines a back pocket that receives a rear damper-filler body adapted to absorb noise from a rotating fan rotor. The rear damper-filler body may be arranged axially between the liner-filler body and the back of the fan case. The rear damper-filler body may include a honeycomb material having a density lower than a density of the liner-filler body.

In some embodiments, the annular outer shroud may be made of a composite material including a plurality of reinforcing fibers suspended in a matrix material. In some embodiments, the inner skin and the outer skin may be made of a plurality of layers including reinforcing fibers.

In some embodiments, the inner skin may include an outer layer, an inner layer, and an intermediate layer. The outer layer may be made of reinforcing fibers suspended in a matrix material. The inner layer may be made of reinforcing fibers suspended in a matrix material. The intermediate layer may be arranged between the outer layer and the inner layer made of woven, braided, or other architectures for reinforcing fibers not suspended in a matrix material.

In some embodiments, the liner-filler body may include a honeycomb material having similar or different density when compared to the density of one or more of the inner and outer layers combined to achieve a particular capability. In some embodiments, the composite liner may include a plurality of segments arranged to form an annular assembly arranged around the central axis.

According to another aspect of the present disclosure, a fan case adapted to extend around blades of a fan rotor may include an annular outer shroud, a composite liner, and a plurality of fasteners. The annular outer shroud may be arranged around a central axis and extend axially between a front and a back of the fan case. The annular outer shroud may have an outer radial surface facing away from the central axis and an inner radial surface facing toward the central axis.

The composite liner may be arranged along the inner radial surface of the annular outer shroud. The composite liner may include an outer skin, an inner skin, and a liner-filler body. The outer skin may be arranged in confronting relation with the inner radial surface of the annular outer shroud. The inner skin may be spaced apart from the inner radial surface of the annular outer shroud. The liner-filler body may be arranged between the outer skin and the inner skin along a portion of the annular outer shroud between the front and the back of the fan case. The plurality of fasteners may extend through the annular outer shroud from the outer radial surface of the annular outer shroud into the composite liner to secure the composite liner to the annular outer shroud.

In some embodiments, some of the plurality of fasteners may be arranged axially between the liner-filler body and the front of the fan case and some of the plurality of fasteners may be arranged axially between the liner-filler body and the back of the fan case. In some embodiments, the plurality of fasteners may extend through the outer skin and the inner skin of the composite liner.

In some embodiments, the annular outer shroud may include a composite material including a plurality of reinforcing fibers suspended in a matrix material. In some embodiments, each of the plurality of fasteners may extend through a corresponding load-spreading washer arranged along the outer radial surface of the annular outer shroud.

In some embodiments, each of the plurality of fasteners may be threaded and engage corresponding threaded fastener receivers mounted to the composite liner. In some embodiments, the fastener receivers may be mounted by a potting material in pockets formed in the composite liner.

In some embodiments, the inner skin may be bonded to the outer skin adjacent to the front of the fan case and cooperates with the outer skin to define a front pocket. The inner skin is bonded to the outer skin adjacent to the back of the fan case and cooperates with the outer skin to define a back pocket. The composite liner may further include a forward damper and a rear damper. The forward damper may be received in the front pocket and arranged axially between the liner-filler body and the front of the fan case to dampen noise from a fan rotor rotating in the fan case. The rear damper may be received in the back pocket and arranged axially between the liner-filler body and the back of the fan case to dampen noise from a fan rotor rotating in the fan case.

According to another aspect of the present disclosure, a fan case adapted to extend around blades of a fan rotor includes an annular outer shroud and a composite inner skin. The annular outer shroud may be arranged around a central axis. The annular outer shroud may have an outer radial surface facing away from the central axis and an inner radial surface facing toward the central axis. The composite inner skin may be arranged along the inners radial surface of the annular outer shroud. The composite inner skin may include an outer layer, an inner layer, and an intermediate layer. The outer layer may be made of reinforcing fibers suspended in a matrix material. The inner layer may be made of reinforcing fibers suspended in a matrix material. The intermediate layer may be arranged between the outer layer and the inner layer made of reinforcing fibers not suspended in a matrix material.

In some embodiments, the outer layer may be bonded to the inner layer between the intermediate layer and a front of the fan case. The outer layer may be bonded to the inner layer between the intermediate layer and a back of the fan case. The intermediate layer may be arranged in a slot formed between bonded portions of the outer layer and the inner layer.

In some embodiments, the fan case may further include a plurality of fasteners that extend through the annular outer shroud from the outer radial surface of the annular outer shroud to secure the composite inner skin to the annular outer shroud. In some embodiments, some of the plurality of fasteners may be arranged between the intermediate layer and the front of the fan case and some of the plurality of fasteners may be arranged between the intermediate layer and the back of the fan case.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
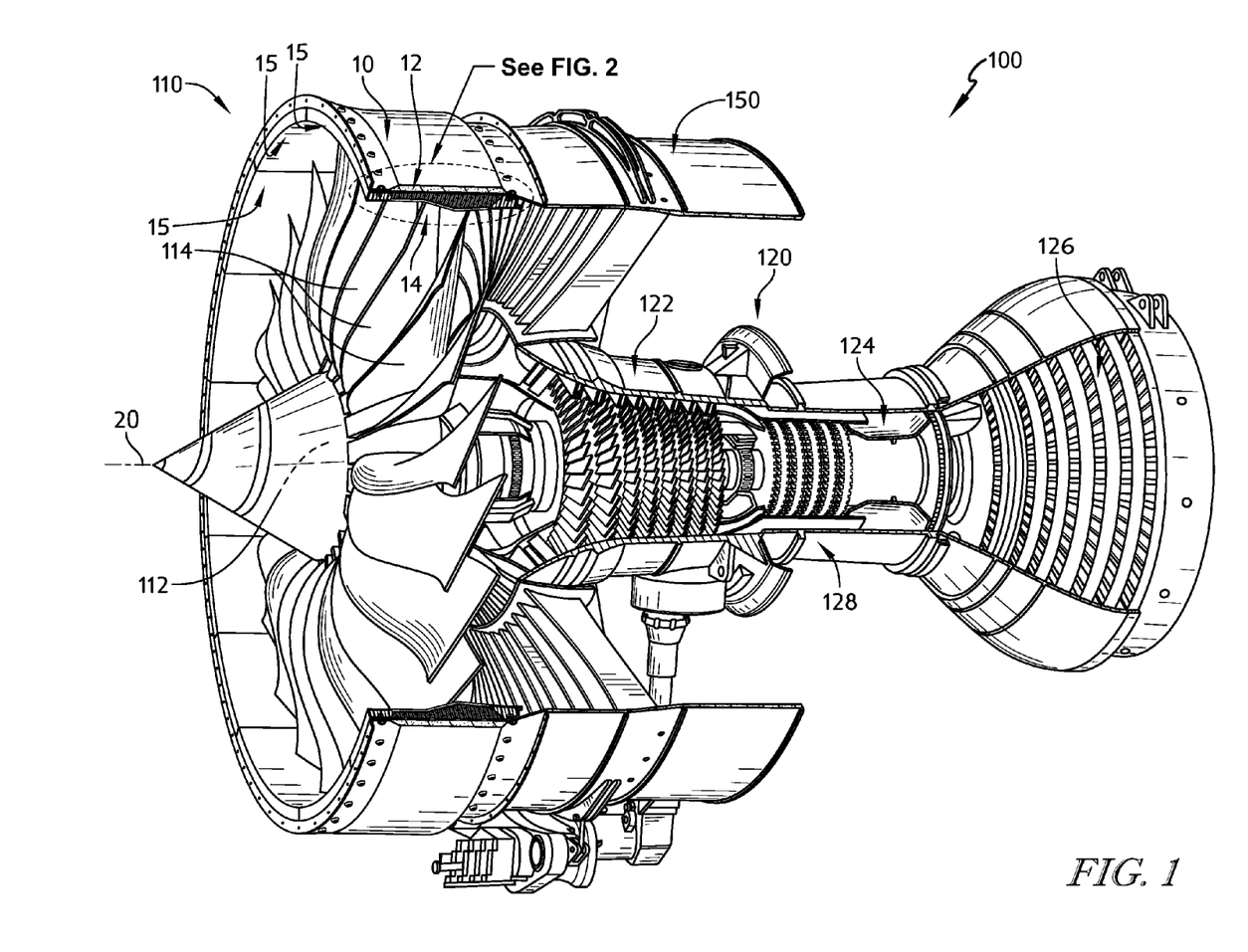
FIG. 1 is a cutaway view of a gas turbine engine including a fan case showing that the fan case surrounds fan blades included in a fan rotor and showing that the fan case includes an annular outer shroud and a composite liner formed by a number of segments positioned between the fan blades and the annular outer shroud.

An illustrative aerospace gas turbine engine 100 used in aircraft includes a fan assembly 110 driven by an engine core 120 to push air through the engine 100 and provide thrust for the aircraft as shown in FIG. 1. The illustrative fan assembly 110 includes a fan rotor 112 having a number of fan blades 114 and a fan case 10 that extends around the fan blades 114 of the fan rotor 112. The fan case 10 both guides the air pushed by the fan blades 114 and provides retention means for blocking fan blades 114 from being thrown out of the fan assembly 110 in case of a blade-off event in which a fan blade 114 is released from the fan rotor 112 during operation of the gas turbine engine 100.

Figure 2:
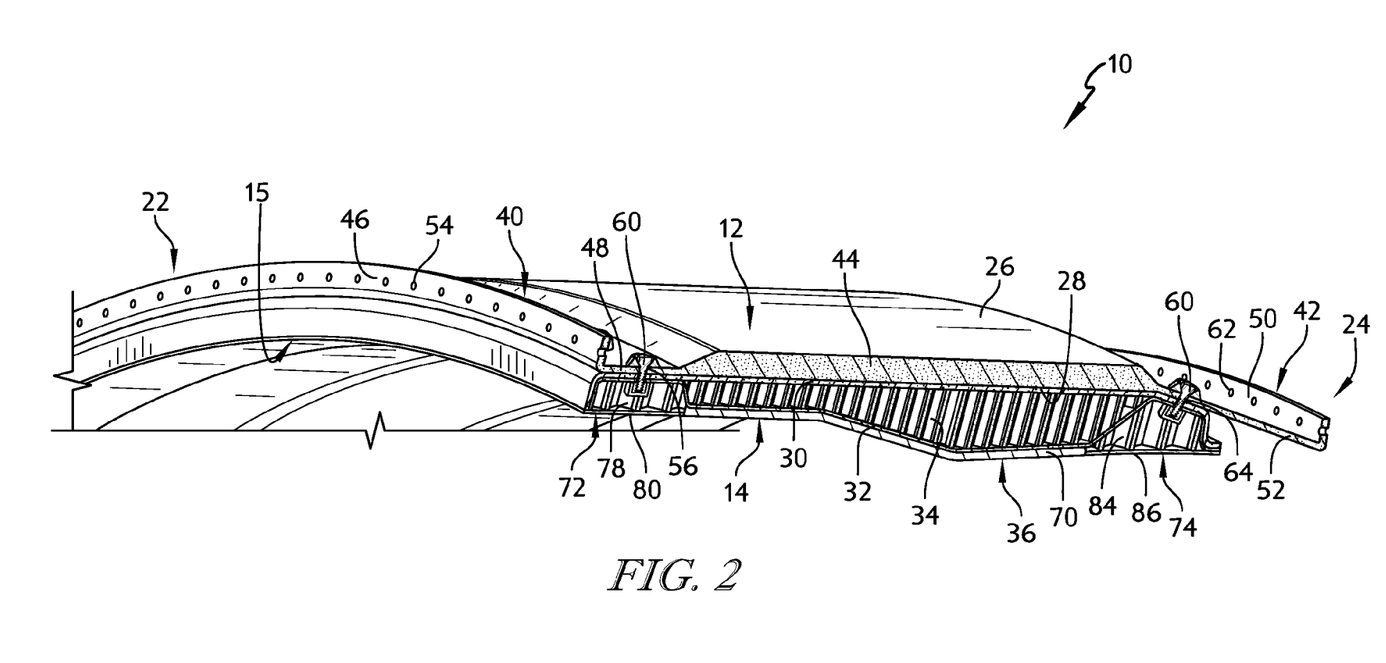
FIG. 2 is an enlarged cutaway view of the fan case of FIG. 1 showing that the composite liner of the fan case is arranged along an inner radial surface of the annular outer shroud of the fan case.

The fan case 10 illustratively includes an annular outer shroud 12 and a composite liner 14 as shown in FIG. 2. The fan case 10 extends around and along a central axis 20 between a front end 22 (sometimes called the front of the fan case 10) and a back end 24 (sometimes called the back of the fan case 10). The annular outer shroud 12 is illustratively made from composite materials. The composite liner 14 is arranged along an inner radial surface 28 of the annular outer shroud 12 to reinforce the annular outer shroud 12 and to circumferentially distribute forces from a blade-off event around the annular outer shroud 12.

Figure 3:
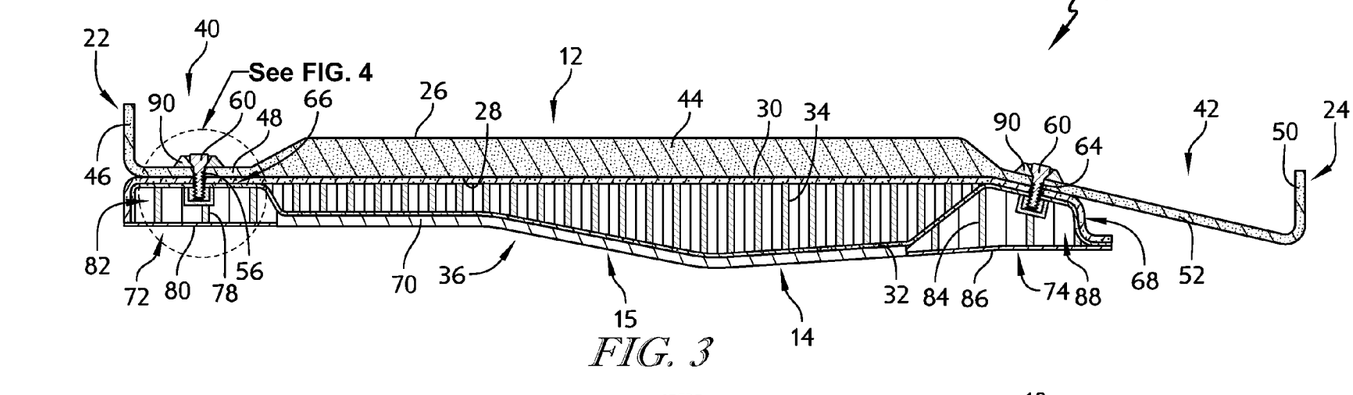
FIG. 3 is a cross-sectional view of the fan case of FIG. 2 showing the annular outer shroud, the composite liner arranged along the inner radial surface of the outer shroud, and a plurality of fasteners extending through the annular outer shroud to secure the composite liner to the annular outer shroud.

In the illustrative embodiment, the composite liner 14 is formed from a plurality of circumferentially-extending segments 15 that cooperate to define a full ring as shown in FIG. 1. Each segment 15 of the composite liner 14 is independently removable for replacement and includes an outer skin 30, an inner skin 32, and a liner-filler body 34 as shown in FIGS. 2 and 3. The outer skin 30 is arranged in confronting relation with the inner radial surface 28 of the annular outer shroud 12. The inner skin 32 is bonded to the outer skin 30 to adjacent to the front end 22 of the fan case 10 and bonded to the outer skin 30 adjacent to the back end 24 of the fan case 10. The liner-filler body 34 is positioned radially between the outer skin 30 and the inner skin 32 and axially between the bonded portions of the inner skin 32 and the outer skin 30.

Portions of the outer skin 30, the inner skin 32, and the liner-filler body 34 of the segments 15 included in the composite liner 14 cooperate to form a force-distribution band 36 located between the front end 22 and the back end 24 of the fan case 10 as shown in FIG. 3. The force-distribution band 36 is adapted to circumferentially distribute forces from a fan blade 114 released outwardly from the fan rotor 112 rotating in the fan case 10 so that forces are not point loaded onto the annular outer shroud 12 when the released blade 114 contacts the surrounding fan case 10.

The fan assembly 110 is illustratively mounted to the turbine engine core 120 to be driven by the engine core 120 as shown, for example, in FIG. 1. The engine core 120 includes a compressor 122, a combustor 124, and a turbine 126 all mounted to a case 128. The compressor 122 is configured to compress and deliver air to the combustor 124. The combustor 124 is configured to mix fuel with the compressed air received from the compressor 122 and to ignite the fuel. The hot high pressure products of the combustion reaction in the combustor 124 are directed into the turbine 126 and the turbine 126 extracts work to drive the compressor 122 and the fan assembly 110.

The annular outer shroud 12 is illustratively an integral full ring arranged around and along the central axis 20 as shown in FIG. 1. The annular outer shroud 12 includes an outer radial surface 26 facing outward in a radial direction away from the central axis 20 and the inner radial surface 28 facing inward in the radial direction toward the central axis 20. In the illustrative embodiment, the annular outer shroud 12 is made from composite materials including a plurality of reinforcing fibers suspended in a matrix material as shown in FIG. 3. In some embodiments, the annular outer shroud 12 is formed from a number of layers. The layers may be bonded separately, integrally, or as a combination of assembled features.

The composite material may include a carbon fiber, an aramid fiber, poly{2,6-diimidazo[4,5-b:4',5'-e]-pyridinylene-1,4(2,5-dihydroxy)phenylene} (PIPD) (also called M5 fiber), or other organic or in-organic fiber. The fiber architecture could be a unidirectional, bidirectional, tridirectional, multidirectional, braided, woven, chrocheted, or other textile form. The matrix may be an epoxy, high temperature Bis-Maleimides (BMI), polyimide, or other resin that is toughened or un-toughened. The infusion may be any variation of RTM, VARTM, Pre-Preg autoclave, Pre-Preg out of autoclave, etc.

Figure 6:
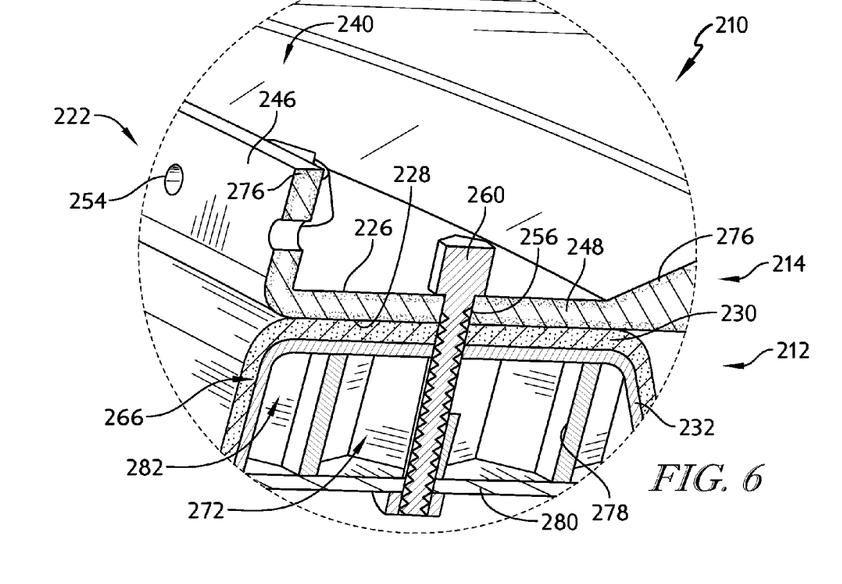
FIG. 6 is an enlarged view of the fan case of FIG. 5 showing that a fastener extends through the annular outer shroud from an outer radial surface of the annular outer shroud and through the composite liner to secure the composite liner to the annular outer shroud and further showing that the outer radial surface and an inner radial surface of the annular outer shroud have been infused with nano-particles.

In some embodiments, the annular outer shroud 12 is infused with nano-fiber reinforcements as suggested in FIG. 6. The nano-fiber reinforcements may be the same or a different material as the annular outer shroud 12.

In other embodiments, the annular outer shroud 12 is made from metal or another material. In some embodiments, the annular outer shroud 12 is coated with electrodeposited (sometimes called plated) nanocrystalline material. The nanocrystalline material may be made of nickel, cobalt, or other metal(s).

The annular outer shroud 12 is formed to include a front mount 40, a back mount 42, and a blade-retainer body 44 extending between the front mount 40 and the back mount 42 as shown in FIGS. 2 and 3. The front mount 40 is adapted to couple the fan case 10 to the aircraft. The back mount 42 is adapted to couple the fan case 10 to a bypass duct 150 included in the gas turbine engine 100 as shown in FIG. 1. The blade-retainer body 44 is adapted to block a released fan blade 114 from escaping the fan case 10.

The front mount 40 is formed to include a front flange 46 that extends radially outward away from the central axis 20 and a front angled wall 48 that is angled relative to the front flange 46 as shown in FIGS. 2 and 3. The front flange 46 is formed to include a number of engine mount holes 54 spaced apart circumferentially and axially extending through the front flange 46. The front angled wall 48 is formed to include a number of liner mount holes 56 spaced apart circumferentially and extending through the front angled wall 48 radially.

Figure 4:
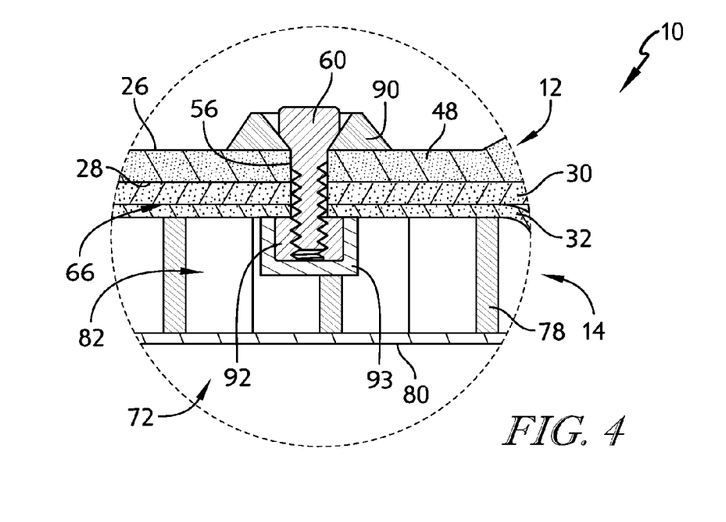
FIG. 4 is an enlarged view of a fastener of FIG. 3 showing that the fastener extends through the annular outer shroud from an outer radial surface of the annular outer shroud and into the composite liner to secure the liner to the annular outer shroud.

In the illustrative embodiment, each liner mount hole 56 is sized to receive a fastener 60 as shown in FIG. 4. The fasteners 60 extend through the annular outer shroud 12 from the outer radial surface 26 and into the composite liner 14 to secure the composite liner 14 to the annular outer shroud 12. The liner mount holes 56 may be axially spaced apart from the front flange 46 by a range of distances and circumferentially spaced apart from each other by a range of distances so that the composite liner 14 is coupled to the annular outer shroud 12 in locations to achieve desired performance characteristics of the such as, for example, vibration damping.

The back mount 42 includes a back flange 50 that extends radially outward away from the central axis 20 and a back angled wall 52 that is angled relative to the back flange 50 as shown in FIGS. 2 and 3. The back flange 50 is formed to include a number of engine mount holes 62 spaced apart circumferentially and axially extending through the back flange 50. The back angled wall 52 is formed to include a number of liner mount holes 64 spaced apart circumferentially and extending through the back angled wall 52 radially. Each liner mount hole 64 is sized to receive a fastener 60 that extends through the annular outer shroud 12 from the outer radial surface 26 and into the composite liner 14 to secure the composite liner 14 to the annular outer shroud 12. The liner mount holes 64 may be axially spaced apart from the back flange 50 by a range of distances and circumferentially spaced apart from each other by a range of distances so that the composite liner 14 is coupled to the annular outer shroud 12 in locations to achieve desired performance characteristics of the such as, for example, vibration damping.

The blade-retainer body 44 of the annular outer shroud 12 extends axially between the front angled wall 48 of the front mount 40 and the back angled wall 52 of the back mount 42 as shown in FIG. 2. The blade-retainer body 44 is relatively thicker than the angled walls 48, 52 to block released fan blades 114 from escaping the fan case 10.

The composite liner 14 is arranged along the inner radial surface 28 of the annular outer shroud 12 to reinforce the annular outer shroud 12 as shown in FIG. 3. The composite liner 14 circumferentially distributes forces from a released fan blade 114 so that forces are not point loaded onto the annular outer shroud 12 when a released fan blade 114 contacts the surrounding fan case 10. In some embodiments, the composite liner 14 provides a flowpath around the fan blades 114 capable of enduring a rub-in during operation of the gas turbine engine. In some embodiments, the composite liner 14 provides stiffening capability to the annular outer shroud 12. In some embodiments, the composite liner 14 provides dynamic stability to the fan case 10.

The composite liner 14 includes the plurality of segments 15 arranged to form an annular assembly arranged around the central axis 20 to accommodate repairs to portions of the composite liner 14 without full replacement as shown in FIG. 1. Each of the plurality of segments 15 is adapted to be individually installed and removed from the annular outer shroud 12. In some embodiments, the segments overlap each other circumferentially. The segments 15 of the composite liner 14 are fastened to the annular outer shroud 12 by fasteners 60. In other embodiments, the composite liner 14 is bonded to the annular outer shroud 12 by adhesive.

The outer skin 30 of the composite liner 14 is arranged in confronting relation with the inner radial surface 28 of the annular outer shroud 12 as shown in FIGS. 2 and 3. The inner skin 32 is bonded to the outer skin 30 adjacent to the front end 22 of the fan case 10 to form a front bonded portion (sometimes called an axially-forward section) 66 and bonded to the outer skin 30 adjacent to the back end 24 of the fan case 10 to form a back bonded portion (sometimes called an axially-rearward section) 68. The liner-filler body 34 is positioned radially between the outer skin 30 and the inner skin 32 and axially between the bonded portions 66, 68 of the inner skin 32 and the outer skin 30. In other embodiments, the composite liner 14 includes one or more intermediate skins positioned between the outer and inner skins 30, 32.

In the illustrative embodiment, a portion of the front bonded portion 66 and/or the back bonded portion 68 extends inwardly toward the central axis 20 as shown in FIGS. 2 and 3. The inwardly-extending portions block released fan blades 114 and other components from escaping the front end 22 and back end 24 of the fan case 10 respectively. In some embodiments, a portion of the front bonded portion 66 and/or back bonded portion 68 extends inwardly toward the central axis 20 and forms a hook feature. In some embodiments, the outer skin 30 and/or the inner skin 32 are perforated for acoustic attenuation.

In some embodiments, a portion of the front bonded portion 66 forms an upstream portion adjacent to the front end 22 of the fan case 10, a downstream portion that is downstream of the upstream portion, and a transition portion coupled between the upstream portion and downstream portion. The upstream portion has a diameter greater than the downstream portion and the transition portion has a smoothly curved increase in diameter between the upstream portion and the downstream portion. The transition portion and the upstream portion have substantially the same thickness and the transition portion is allowed to flex to reduce impact loads transmitted to the upstream portion. A hook feature may extend inwardly from the downstream portion.

In illustrative embodiments, the outer skin 30 is an integral component made from a composite material including a plurality of reinforcing fibers suspended in a matrix material as shown in FIG. 3. In some embodiments, the outer skin 30 is formed from a number of layers. The layers may be bonded separately, integrally, or as a combination of assembled features.

In illustrative embodiments, the inner skin 32 is integral component made from a composite material including a plurality of reinforcing fibers suspended in a matrix material as shown in FIG. 3. In some embodiments, the inner skin 32 is formed from a number of layers. The layers may be bonded separately, integrally, or as a combination of assembled features.

The outer skin 30, the inner skin 32, and any intermediate skin may be made from a composite material. The outer skin 30, the inner skin 32, and any intermediate skin may be made from the same or different composite materials. The composite material may include a carbon fiber, an aramid fiber, poly{2,6-diimidazo[4,5-b:4',5'-e]-pyridinylene-1,4(2, 5-dihydroxy)phenylene} (PIPD), or other organic or inorganic fiber. The fiber architecture could be a unidirectional, bidirectional, tridirectional, multidirectional, braided, woven, chrocheted, or other textile form. The matrix may be an epoxy, high temperature Bis-Maleimides (BMI), polyimide, or other resin that is toughened or un-toughened. The infusion may be any variation of RTM, VARTM, Pre-Preg autoclave, Pre-Preg out of autoclave, etc.

In some embodiments, the outer skin 30, the inner skin 32, and/or any intermediate skin may be infused with nano-fiber reinforcement. The nano-fiber reinforcement may be the same or a different material as the underlying outer skin 30, the inner skin 32, or intermediate skin. In other embodiments, the outer skin 30, the inner skin 32, and/or any intermediate skin may be made from metal or another material. The outer skin 30, the inner skin 32, and/or any intermediate skin may be coated with electrodeposited (sometimes called plated) nanocrystalline. The nanocrystalline may be made of nickel, cobalt, or other metal(s).

The liner-filler body 34 illustratively includes a honeycomb material made from aluminum having a first density as shown in FIG. 3. The liner-filler body 34 may be made of other metals or other non-metallic materials such as, for example, aramid or plastic(s). The strength, stiffness, Poisson behavior, and other mechanical characteristics may be designed to provide desired structural performance of the fan case 10 such as, for example, dynamics, containment, and structural weight efficiency. The design and materials of the outer skin 30, inner skin 32, and the liner-filler body 34 may be chosen to avoid galvanic corrosion. In some embodiments, the liner-filler body 34 may include a honeycomb material having similar or different density when compared to the density of one or more of the inner and outer skins 32, 30 combined to achieve a particular capability. In other embodiments, the honeycomb material may have a density lower than a density of the inner skin 32 and the outer skin 30.

In illustrative embodiments, the composite liner 14 additionally includes an abraidable layer 70 as shown in FIG. 3. The abraidable layer 70 is coupled to the inner skin 32 to position the inner skin 32 between the liner-filler body 34 and the abraidable layer 70. During operation of the engine, one or more of the fan blades 114 may contact the abraidable layer and the contacted portions of the abraidable layer 70 are adapted to separate from the composite liner 14 without harming the fan blades 114 or fan case 10. As such, a close dimensional tolerance between the fan blades 114 and the composite liner 14 is achieved. In the illustrative embodiment, the abraidable layer 70 is made of low density epoxy filled honeycomb. In other embodiments, the abraidable layer 70 is made from other abraidable material(s).

In illustrative embodiments, the composite liner 14 additionally includes a forward damper 72 and a rear damper 74 as shown in FIGS. 2 and 3. The forward and rear dampers 72, 74 are adapted to absorb (sometimes called dampen) noise from the rotating fan rotor 112.

The forward damper 72 includes a forward damper-filler body 78 and a forward damper skin 80 as shown in FIGS. 2 and 3. The forward damper-filler body 78 includes a honeycomb material having a second density that is illustratively less than the first density of the honeycomb material of the liner-filler body 34. The honeycomb material may be filled with a material such as, for example, epoxy. The forward damper-filler body 78 is made from aluminum in the illustrative embodiment. The forward damper skin 80 is made from a composite material including a plurality of reinforcing fibers suspended in a matrix material as shown in FIG. 3. The composite material may be the same or different than those of the outer and inner skins 30, 32.

The front bonded portion 66 of the outer and inner skins 30, 32 cooperates with an unbonded portion of the inner skin 32 to form a front damper-receiver pocket 82 as shown in FIG. 3. The forward damper-filler body 78 is received in the front damper-receiver pocket 82 and coupled to the inner skin 32 so that the forward damper-filler body 78 is axially positioned between the front end 22 of the fan case 10 and the liner-filler body 34 of the composite liner 14. The forward damper skin 80 is coupled to the forward damper-filler body 78 to locate the forward damper-filler body 78 radially between the inner skin 32 and the forward damper skin 80. A portion of the front damper-receiver pocket 82 adjacent to the front end 22 of the fan case 10 extends radially inward toward the central axis 20 and blocks a fan blade 114 from exiting the front end 22 of the fan case 10, if a fan blade 114 is released from the fan rotor 112 during operation.

The rear damper 74 includes a rear damper-filler body 84 and a rear damper skin 86 as shown in FIG. 3. The rear damper-filler body 84 includes a honeycomb material having a third density that is illustratively less than the first density of the honeycomb material of the liner-filler body 34. The honeycomb material may be filled with a material such as, for example, epoxy. The rear damper-filler body 84 is made from aluminum in the illustrative embodiment. The rear damper skin 86 is a monolithic component made from a composite material including a plurality of reinforcing fibers suspended in a matrix material as shown in FIG. 3. The composite material may be the same or different than those of the outer and inner skins 30, 32.

The back bonded portion 68 of the outer and inner skins 30, 32 cooperates with an unbonded portion of the inner skin 32 to form a back damper-receiver pocket 88 as shown in FIG. 3. The rear damper-filler body 84 is received in the back damper-receiver pocket 88 and coupled to the inner skin 32 such that the rear damper-filler body 84 is axially positioned between the back end 24 of the fan case 10 and the liner-filler body 34. The rear damper skin 86 is coupled to the rear damper-filler body 84 to locate the rear damper-filler body 84 radially between the inner skin 32 and the rear damper skin 86. A portion of the back damper-receiver pocket 88 adjacent to the back end 24 of the fan case 10 extends radially inward toward the central axis 20 and blocks a fan blade 114 or other components such as, for example, a guide vane from exiting the back end 24 of the fan case 10, if a fan blade 114 is released from the fan rotor 112 during operation.

In illustrative embodiments, the fan case 10 additionally includes the plurality of fasteners 60 as shown in FIGS. 1-4. The plurality of fasteners 60 extend through the annular outer shroud 12 from the outer radial surface 26 and into the composite liner 14 to secure the composite liner 14 to the annular outer shroud 12. In other embodiments, the plurality of fasteners extend through the composite liner 14 and into the inner radial surface 28 of the annular outer shroud 12 to secure the composite liner 14 to the annular outer shroud 12.

In the illustrative embodiment, some of the plurality of fasteners 60 are arranged to extend through the liner mount holes 56 to be positioned axially between the liner-filler body 34 and the front end 22 of the fan case 10 as shown in FIGS. 2 and 3. Some of the plurality of fasteners 60 are arranged to extend through the liner mount holes 64 to be positioned axially between the liner-filler body 34 and the back end 24 of the fan case 10. The plurality of fasteners 60 extend through the bonded portions 66, 68 of the outer and inner skins 30, 32.

In illustrative embodiments, each of the plurality of fasteners 60 extend through a corresponding load-spreading washer 90 arranged along the outer radial surface 26 of the annular outer shroud 12 as shown in FIG. 4. Each of the plurality of fasteners 60 are threaded and engage a corresponding threaded fastener receiver 92 mounted to the composite liner 14. In illustrative embodiments, some of the fastener receivers 92 are mounted in the front and back damper-receiver pockets 82, 84 by a potting material 93.

In other embodiments, the fasteners 60 include standard bolts and nuts as suggested in FIGS. 5-9. In some embodiments, a collar may be positioned around the liner mount holes 56, 64. In some embodiments, a riveted nut-plate may be used. In some embodiments, the fasteners 60 include load-spreading bolts.

The front, back, and any intermediate locations where the composite liner 14 may be bolted may include a bushing/collar which may be inserted through the casing. The bushing/collar may be inserted while the composite preform is dry by moving fibers or by mechanically removing material in the desired shape to allow the bushing/collar to be installed.

A flange/lip on one or both ends may provide a means of added securing the fastener to the composite, with an option for multiple pieces threaded together to form the resulting bushing/collar. For bushings/collars installed in dry fabric, the feature can be masked and co-cured with the composite case. More elaborate bushings can be used which may incorporate a nut-plate like feature to allow the fastener to be directly mated to the inserted bushing/collar, which may require anti-rotation features such as, for example, non-axisymmetric features or rivets. The additional features may also be co-cured and inserted between fibers or inserted after mechanically removing some of the composite case. The material for the feature can be metallic such as, for example, steel, titanium, nickel, and alloys or non-metallic materials.

Another illustrative fan case 210 adapted for use in gas turbine engine 100 is shown in FIGS. 5-9. The fan case 210 is substantially similar to the fan case 10 shown in FIGS. 1-4 and described herein. Accordingly, similar reference numbers in the 200 series indicate features that are common between the fan case 10 and the fan case 210. The description of the fan case 10 is hereby incorporated by reference to apply to the fan case 210, except in instances when it conflicts with the specific description and drawings of the fan case 210.

Figure 5:
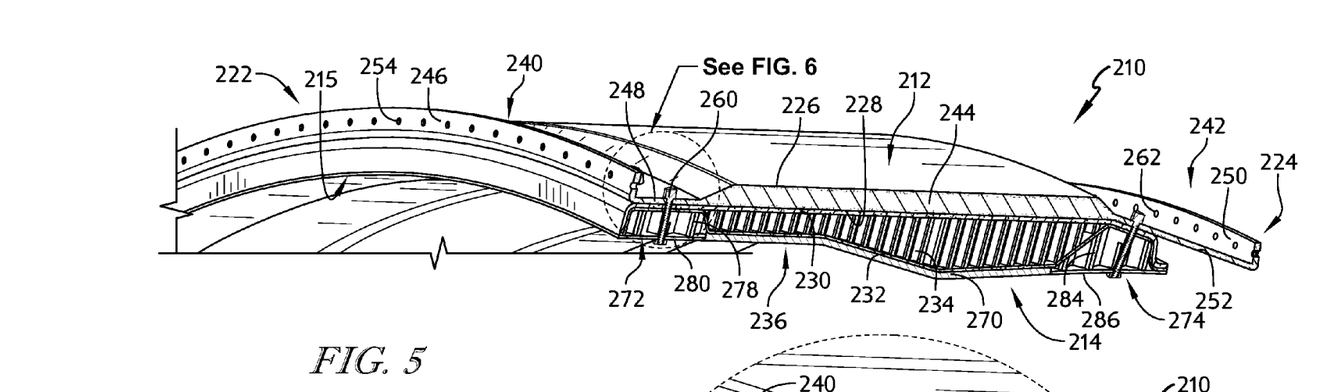
FIG. 5 is an enlarged cutaway view of another fan case showing that the fan case includes an annular outer shroud and a composite liner arranged along an inner radial surface of the annular outer shroud.

Fan case 210 includes the annular outer shroud 212 and the composite liner 214 as shown in FIG. 5. The annular outer shroud 212 is infused with nano-fiber reinforcements 276 as shown in FIG. 6. The nano-fiber reinforcements 276 improve delamination issues of the composite material that forms the annular outer shroud 212. The nano-fiber reinforcement improves the strength, ballistic capability, and thermal properties of the annular outer shroud 212. The nano-fiber reinforcements 276 distribute forces across the fibers in the composite material, improve crack growth characteristics, and improve rupture characteristics of the annular outer shroud 212.

The nano-fiber reinforcements 276 may be the same or a different material as the annular outer shroud 212. As an example, the composite material may include a carbon fiber, an aramid fiber, poly{2,6-diimidazo[4,5-b:4',5'-e]-pyridinylene-1,4(2,5-dihydroxy)phenylene} (PIPD), or other organic or in-organic fiber.

The outer radial surface 226 and the inner radial surface 228 of the annular outer shroud 212 are infused with nano-fiber reinforcement from the front end 222 of the fan case 210 to the back end 224 of the fan case 210 as shown in FIG. 6. In other embodiments, one of the outer and inner radial surfaces 226, 228 are infused with nano-fiber reinforcements 276.

In other embodiments, the annular outer shroud 212 may be infused with nano-fiber reinforcements 276 at specific locations such as, for example, the front and back flanges 246, 250 in the fillet regions and through the turned portions to reduce delamination, among other things. As another example, portions of the annular outer shroud 212 surrounding holes 254, 256, 262, 264 may be infused with nano-fiber reinforcements 276. In another example, the blade-retainer body 244 of the annular outer shroud 212 may be infused with nano-fiber reinforcements 276. In other embodiments, the outer skin 230, the inner skin 232, and any intermediate skins may be infused with nano-fiber reinforcements 276.

Figure 8:
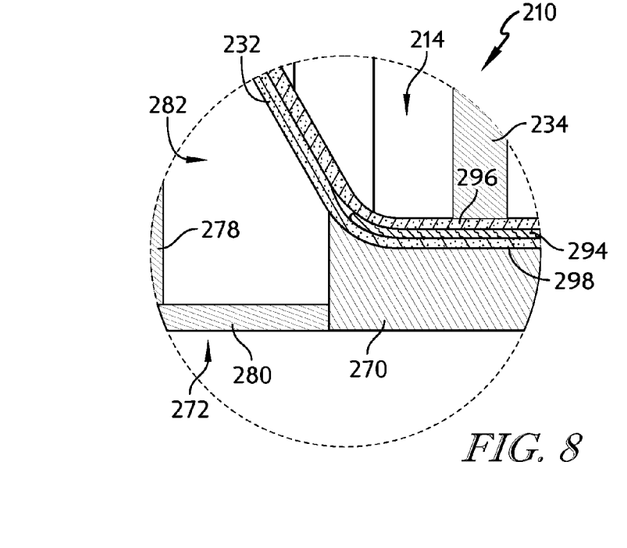
FIG. 8 is an enlarged view of the composite liner of FIG. 7 showing that the composite liner includes an inner skin and the inner skin includes an outer layer, an inner layer, and an intermediate layer arranged between the outer and inner layers and the outer and inner layers are bonded together at a back end of the fan case.
Figure 9:
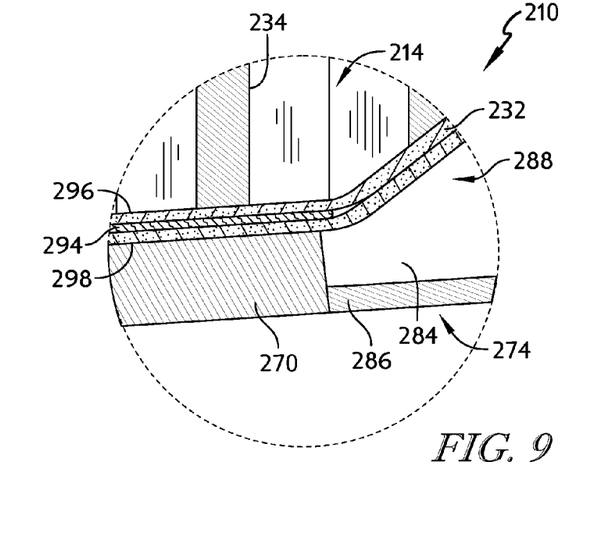
FIG. 9 is an enlarged view of the composite liner of FIG. 7 showing that the inner skin of the composite liner includes the outer layer, the inner layer, and the intermediate layer arranged between the outer and inner layers and the outer and inner layers are bonded together at a front end of the fan case.

The composite liner 214 illustratively includes a dry layer 294 (sometimes called an intermediate layer 294) positioned in the inner skin 232 as shown in FIGS. 8 and 9. The dry layer 294 is adapted to circumferentially distribute forces from a fan blade 114 released outwardly from the fan rotor 112 rotating in the fan case 210 so that forces are not point loaded onto the annular outer shroud 212 when the released blade 114 contacts the surrounding fan case 210.

The inner skin 232 includes an outer layer 296, the dry layer 294, and an inner layer 298 as shown in FIGS. 8 and 9. The outer layer 296 and the inner layer 298 are made of reinforcing fibers suspended in a matrix material. The dry layer 294 is arranged between the outer layer 296 and the inner layer 298 such that the dry layer 294 is not exposed to environment surrounding the fan case 210. The dry layer 294 is made of woven, braided, or other architectures for reinforcing fibers not suspended in a matrix material. In some embodiments, a release film is wrapped around the dry layer 294.

The outer layer 296 is bonded to the inner layer 298 between the dry layer 294 and the front end 222 of the fan case 210 as shown in FIG. 8. The outer layer 296 is bonded to the inner layer 298 between the dry layer 294 and the back end 224 of the fan case 210 as shown in FIG. 9. In the illustrative embodiment, the outer layer 296 is bonded to the inner layer 298 between the liner mount holes 256, 264 at the front end 222 of the fan case 210 and at the back end 224 of the fan case 210 as shown in FIGS. 8 and 9. The dry layer 294 is axially positioned in a slot formed between the bonded portions of the outer and inner layers 296, 298.

In other embodiments, a dry layer may be included in the annular outer shroud 212 (not shown). In other embodiments, a dry layer may be included in the outer skin 30 or an intermediate skin. In other embodiments, a dry layer may be wrapped around the annular outer shroud 212.

Figure 7:
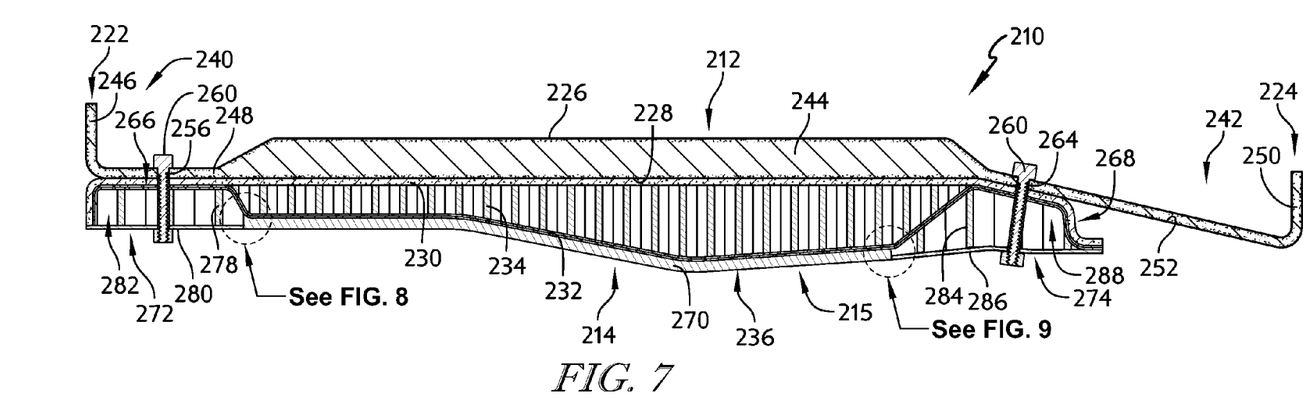
FIG. 7 is a sectional view of the fan case of FIG. 5 showing the annular outer shroud, the composite liner arranged along the outer shroud, and a plurality of fasteners extending through the annular outer shroud and the composite liner to secure the composite liner to the annular outer shroud.

The fan case 210 includes a plurality of fasteners 260 to fasten the inner skin 232 to the annular outer shroud 212 as shown in FIG. 7. The plurality of fasteners 260 include standard bolts and nuts as shown in FIGS. 6 and 7. The bolts extend from the outer radial surface 226 of the annular outer shroud 212 through the annular outer shroud 212 to secure the inner skin 232 to the annular outer shroud 212. In the illustrative embodiment, the bolts 260 extend through the annular outer shroud 212, the outer skin 230, the inner skin 232, and the dampers 272, 274 of the composite liner 214 and engage nuts arranged along the damper skins 280, 286.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case adapted to extend around blades of a fan rotor included in a gas turbine engine, the fan case comprising
an annular outer shroud arranged around a central axis and extending axially between a front and a back of the fan case, the annular outer shroud having an outer radial surface facing away from the central axis and an inner radial surface facing toward the central axis, and
a composite liner arranged along the inner radial surface of the annular outer shroud, the composite liner including an outer skin arranged in confronting relation with the inner radial surface of the annular outer shroud, an inner skin bonded to the outer skin adjacent to the front of the fan case to form an axially-forward section of the composite liner and bonded to the outer skin adjacent to the back of the fan case to form an axially-rearward section of the composite liner, and a liner-filler body arranged radially between the outer skin and the inner skin and axially between the axially-forward section and the axially-rearward section to form a force-distribution band between the front and the back of the fan case, the force-distribution band adapted to circumferentially distribute forces from a blade released outwardly from a fan rotor rotating in the fan case so that the forces are not point loaded onto the annular outer shroud when the released blade contacts the surrounding fan case,
wherein the annular outer shroud is made of a composite material including a plurality of reinforcing fibers suspended in a matrix material,
wherein the liner-filler body includes a honeycomb material having a density lower than a density of the inner skin and the outer skin.

2. The fan case of claim 1, wherein the axially-forward section of the composite liner defines a front pocket that receives a forward damper-filler body adapted to absorb noise from a rotating fan rotor, the forward damper-filler body is arranged axially between the liner-filler body and the front of the fan case, and the forward damper-filler body includes a honeycomb material having a density lower than a density of the liner-filler body.

3. The fan case of claim 1, wherein the axially-rearward section of the composite liner defines a back pocket that receives a rear damper-filler body adapted to absorb noise from a rotating fan rotor, the rear damper-filler body is arranged axially between the liner-filler body and the back of the fan case, and the rear damper-filler body includes a honeycomb material having a density lower than a density of the liner-filler body.

4. The fan case of claim 1, wherein the inner skin and the outer skin are made of a plurality of layers including reinforcing fibers.

5. The fan case of claim 1, wherein the inner skin includes an outer layer made of reinforcing fibers suspended in a matrix material, an inner layer made of reinforcing fibers suspended in a matrix material, and an intermediate layer arranged between the outer layer and the inner layer made of woven reinforcing fibers not suspended in a matrix material.

6. The fan case of claim 1, wherein the composite liner includes a plurality of segments arranged to form an annular assembly arranged around the central axis.

7. A fan case adapted to extend around blades of a fan rotor, the fan case comprising an annular outer shroud arranged around a central axis and extending axially between a front and a back of the fan case, the annular outer shroud having an outer radial surface facing away from the central axis and an inner radial surface facing toward the central axis, a composite liner arranged along the inner radial surface of the annular outer shroud, the composite liner including an outer skin arranged in confronting relation with the inner radial surface of the annular outer shroud, an inner skin spaced apart from the inner radial surface of the annular outer shroud, and a liner-filler body arranged between the outer skin and the inner skin along a portion of the annular outer shroud between the front and the back of the fan case, and a plurality of fasteners that extend through the annular outer shroud from the outer radial surface of the annular outer shroud into the composite liner to secure the composite liner to the annular outer shroud, wherein some of the plurality of fasteners are arranged axially between the liner-filler body and the front of the fan case and some of the plurality of fasteners are arranged axially between the liner-filler body and the back of the fan case, wherein the plurality of fasteners extend through the outer skin and the inner skin of the composite liner.

8. The fan case of claim 7, wherein the annular outer shroud includes a composite material including a plurality of reinforcing fibers suspended in a matrix material.

9. The fan case of claim 8, wherein each of the plurality of fasteners extends through a corresponding load-spreading washer arranged along the outer radial surface of the annular outer shroud.

10. The fan case of claim 7, wherein each of the plurality of fasteners are threaded and engage corresponding threaded fastener receivers mounted to the composite liner.

11. A fan case adapted to extend around blades of a fan rotor, the fan case comprising an annular outer shroud arranged around a central axis and extending axially between a front and a back of the fan case, the annular outer shroud having an outer radial surface facing away from the central axis and an inner radial surface facing toward the central axis, a composite liner arranged along the inner radial surface of the annular outer shroud, the composite liner including an outer skin arranged in confronting relation with the inner radial surface of the annular outer shroud, an inner skin spaced apart from the inner radial surface of the annular outer shroud, and a liner-filler body arranged between the outer skin and the inner skin along a portion of the annular outer shroud between the front and the back of the fan case, and a plurality of fasteners that extend through the annular outer shroud from the outer radial surface of the annular outer shroud into the composite liner to secure the composite liner to the annular outer shroud, wherein each of the plurality of fasteners are threaded and engage corresponding threaded fastener receivers mounted to the composite liner, wherein the fastener receivers are mounted by a potting material in pockets formed in the composite liner.

12. The fan case of claim 11, wherein the inner skin is bonded to the outer skin adjacent to the front of the fan case and cooperates with the outer skin to define a front pocket, the inner skin is bonded to the outer skin adjacent to the back of the fan case and cooperates with the outer skin to define a back pocket, the composite liner further includes a forward damper and a rear damper, the forward damper is received in the front pocket and arranged axially between the liner-filler body and the front of the fan case to dampen noise from a fan rotor rotating in the fan case, and the rear damper is received in the back pocket and arranged axially between the liner-filler body and the back of the fan case to dampen noise from a fan rotor rotating in the fan case.

13. A fan case adapted to extend around blades of a fan rotor, the fan case comprising an annular outer shroud arranged around a central axis, the annular outer shroud having an outer radial surface facing away from the central axis and an inner radial surface facing toward the central axis, and a composite inner skin arranged along the inner radial surface of the annular outer shroud, the composite inner skin including an outer layer made of reinforcing fibers suspended in a matrix material, an inner layer made of reinforcing fibers suspended in a matrix material, and an intermediate layer arranged between the outer layer and the inner layer made of reinforcing fibers not suspended in a matrix material, wherein the outer layer is bonded to the inner layer between the intermediate layer and a front of the fan case, the outer layer is bonded to the inner layer between the intermediate layer and a back of the fan case, and the intermediate layer is arranged in a slot formed between bonded portions of the outer layer and the inner layer.

14. The fan case of claim 13, further comprising a plurality of fasteners that extend through the annular outer shroud from the outer radial surface of the annular outer shroud to secure the composite inner skin to the annular outer shroud.

15. The fan case of claim 14, wherein some of the plurality of fasteners are arranged between the intermediate layer and the front of the fan case and some of the plurality of fasteners are arranged between the intermediate layer and the back of the fan case.

* * * * *